April 18, 1944.　　　H. F. BAUER ET AL　　　2,346,644
METHOD OF BONDING
Filed March 18, 1940　　　2 Sheets-Sheet 2
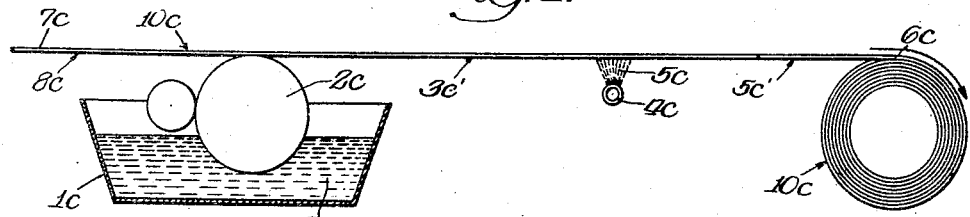
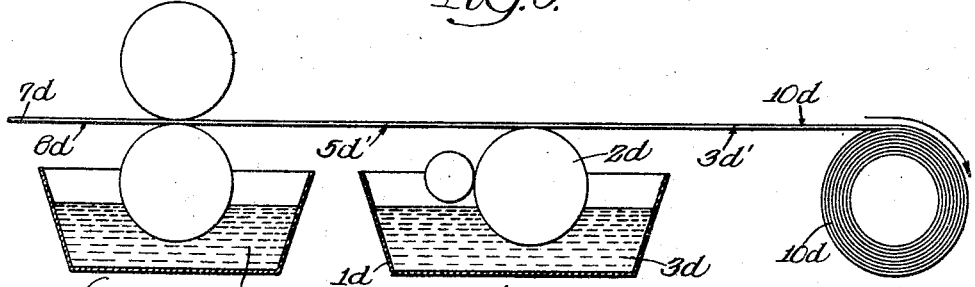
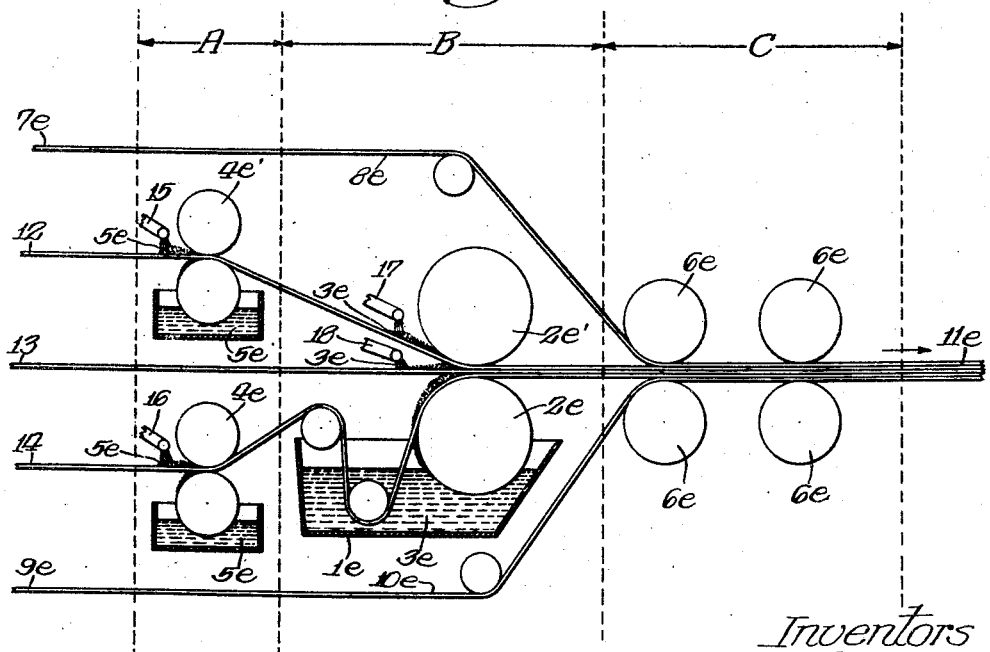
Inventors
Hans F. Bauer
Jordan V. Bauer
Don M. Hawley Patented Apr. 18, 1944

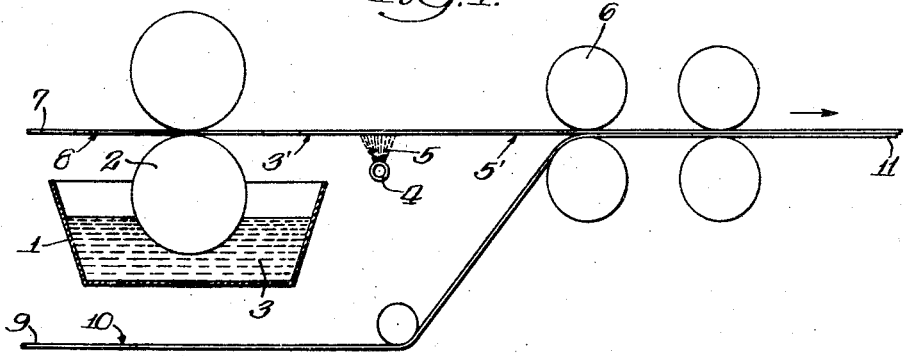
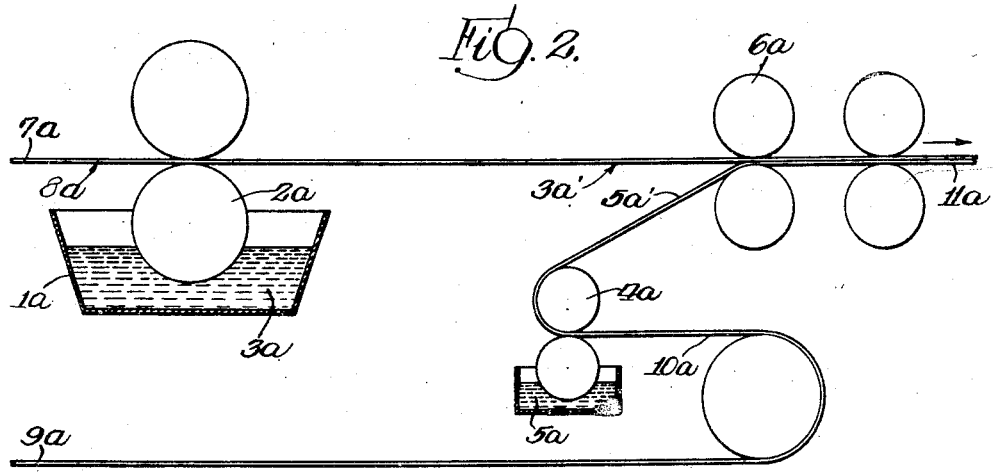
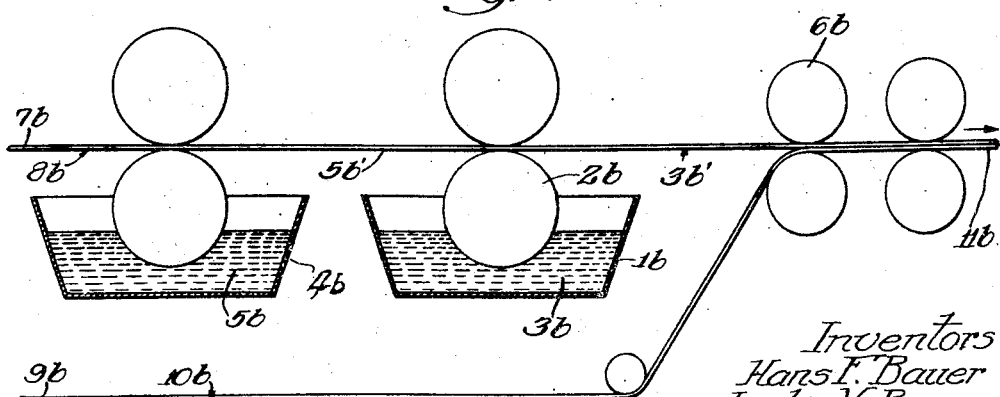

2,346,644

UNITED STATES PATENT OFFICE 2,346,644

METHOD OF BONDING

Hans F. Bauer, Chicago, Jordan V. Bauer, Elmwood Park, and Don M. Hawley, Geneva, Ill., assignors to Stein, Hall Manufacturing Company, Chicago, Ill., a corporation of Delaware Application March 18, 1940, Serial No. 324,520

9 Claims. (Cl. 154—40)

This invention relates to an improved method for bonding two or more surfaces wherein amylaceous adhesives are employed.

The present application is a continuation-in-part of our copending application Serial No. 239,256, filed November 7, 1938.

By the term "amylaceous adhesives" we refer to those types of adhesives which are prepared from starches and starch degradation products such as thin boiling starches, dextrines, starch gums, oxidized starches and enzyme treated starches.

One of the objects of this invention is to provide a new and improved method of applying amylaceous adhesives whereby the adhesive may be applied in a relatively fluid form and by the use of a separate step in the bonding operation will develop immediately strong adhesive properties and set up very rapidly to form a bond.

A further object of the invention is to provide a method of bonding with an amylaceous adhesive which is predominantly starchy in order to utilize to a greater extent the adhesive properties of such amylaceous adhesives.

Another object of the invention is to provide a new and improved type of bonding operation for laminating paper wherein the amylaceous adhesive components are applied in separate phases, one of said phases including the application of an amylaceous adhesive containing an alkaline fluidity increasing agent and the other including the incorporation into the paper or on the surface thereof an acid substance which does not tend to destroy the rosin size in the paper but which is capable of reacting with the alkaline fluidity increasing agent to bring about a decrease in the fluidity or an increase in the viscosity of the adhesive in situ.

Still a further object of this invention is the provision of a new and improved type of activated laminating paper which contains as an activating agent an acid substance that has no adverse effect on the rosin size contained in the paper and which is capable of increasing the viscosity of a predominantly starchy dispersion containing an alkaline fluidity increasing agent. Other objects will appear hereinafter.

It is well known to the adhesive art that the addition of borax to dextrine or starch gum adhesives increases their tackiness and viscosity. Because of this fact a great percentage of the dextrine and starch gum adhesives used today, wherein the adhesive is applied in liquid or paste form and allowed to dry in situ between the surfaces to be bonded, contains borax or mixtures of borax and other alkaline material. Great care must be taken, however, in adding borax and similar viscosity increasing agents to starchy adhesives, particularly to those which are very starchy in nature as contrasted with those that have been degraded to dextrines. One of the difficulties lies in the fact that only small amounts of borax can be used because if larger amounts are employed the amylaceous adhesive composition becomes more or less rubbery and cannot be suitably applied to the surface to be joined.

The very starchy amylaceous materials also present other problems when used as adhesives in laminating operations. Such materials when cooked with water ordinarily set back to a gel on cooling and when this occurs the adhesive is rendered insufficiently fluid to be conveniently applied to the paper surfaces. It is known that when these predominantly starchy materials are cooked with sufficient amounts of caustic alkali they will remain fluid and will not set back to a gel. The adhesive containing substantial amounts of caustic alkali, however, suffers from the disadvantage in laminating operations that the free alkali tends to destroy the rosin size contained in the laminating paper.

In accordance with our present invention we have avoided these disadvantages and provided a new and improved method of laminating in the following manner. We prepare an amylaceous adhesive from a predominantly starchy material of a type hereinafter more fully described by mixing said starchy material with a caustic alkali, as, for example, sodium hydroxide or potassium hydroxide, in the presence of water, with or without heating. A sufficient amount of caustic alkali is employed to produce an amylaceous dispersion which will not set back to a gel. This will ordinarily require about a 1% solution of caustic alkali and preferably about a 1% to a 3% caustic alkali solution. The amount of caustic alkali based upon the weight of the starchy material will vary, depending upon the particular type of starchy material. Ordinarily it is preferable to employ a thin boiling or modified starch which may be dispersed to a fluid condition with the aid of the alkali and with a relatively small amount of water as compared with the amount of water normally required to disperse a raw or undegraded starch. It is usually preferable to employ a starchy polysaccharide which is dispersible to a fluid condition with the aid of an alkali in about 6 parts of water or less. If a 1% caustic alkali solution is used to prepare the dispersion, the amount of caustic alkali based upon the weight of the starch where there are 4 parts of water per part of starch would be about 4%. Even this amount of alkali would ordinarily be too much to obtain the desired result if the alkaline amylaceous adhesive were employed directly in a laminating operation, because the highly alkaline content would tend to destroy the rosin size which is normally present in a laminating paper. Furthermore, the resultant paper board or laminated material would tend to be very hygroscopic which is also undesirable.

The feature of the present invention is to incorporate into the paper or on the surface thereof in a separate phase from the addition of the alkaline amylaceous material an acid substance which has the dual property of reducing the alkalinity of the amylaceous adhesive and by its reaction with the alkali to form sodium tetraborate simultaneously reducing the fluidity or increasing the viscosity. For this purpose we use as the acid material boric acid. By this means the adhesive composition may be applied to the surface of the material in a fluid form but is immediately rendered in situ to an extremely viscous condition which is conducive to great rapidity in the formation of a bond.

This result is not obtainable by prior art methods of using amylaceous adhesives containing borax because it is impractical to spread a thin film of a very viscous adhesive over a surface. It is, therefore, necessary with prior art means to apply the adhesive in a relatively fluid condition and rely on a considerable period of drying time to render the adhesive film viscous enough to form a bond.

The use of boric acid in a separate stage of the bonding operation, as above described, has certain other advantages as compared with the use of borax in a similar manner. For example, the borax has no neutralizing effect and hence, does not serve to reduce the alkalinity of the amylaceous adhesive to which alkali has previously been added to increase its fluidity. Hence, borax cannot take the place of boric acid for the purpose of this invention because the alkali would still be relatively high in the joint or bond between the two surfaces and would still tend to destroy the rosin size and render the paper board or other laminated article hygroscopic. Furthermore, by the use of caustic soda with the starchy adhesive and the introduction of boric acid in a second phase, a more effective degree of viscosity increase is obtained than is possible by the use of borax in a similar manner. The addition of boric acid directly to the laminating paper has the further advantage that the paper may be prepared in advance, for example, by adding the boric acid on the paper machine because an acid material such as boric acid is not detrimental to the rosin size as would be the case if an alkaline material were applied. This makes it possible to prepare in advance an activated laminating paper which can be used with any alkali treated starch in a laminating operation, thus making it unnecessary for the user to carry out the separate step of adding the boric acid. It is ordinarily preferable to employ about 1 oz. to about 8 oz. of boric acid to 1000 sq. ft. of paper surface.

The amount of boric acid to be used is not very critical inasmuch as only that which is on the surface of the paper is immediately available to react with the alkali and cause the desired viscosity increase of the adhesive in situ. For this reason any reasonable amount of boric acid in excess of that required to react with the alkali in the adhesive to form sodium tetra borate is not detrimental. The least amount of boric acid that may be used and still be within the limits of our invention would be that minimum amount which on reaction with the alkali in the adhesive would cause the adhesive to thicken and develop a sufficient degree of bond to hold the paper plies together during the cutting and handling operations.

The advantages of our two stage means of adhesive application from the standpoint of increased speed of bond formation are obvious. This characteristic of extreme rapidity of bond formation while permitting the use of a relatively fluid alkali-containing amylaceous adhesive of the starchier type makes our improved method of adhesive application of great value for such operations as the manufacture of laminated paper board, paper tubes and drums, the lamination of cloth and paper or similar bonding operations where speed of bond formation is an important factor. One of the advantages of using caustic alkali with the starch is that the starch may be gelatinized or dispersed without cooking. Also the reaction of boric acid with caustic alkali in situ takes up some of the water present, in the formation of $Na_2B_4O_7.10H_2O$.

If the boric acid is added to the paper on the laminating machine a certain amount of supplementary equipment is required but the cost of this additional equipment is more than offset by higher operating speeds and the fact that by this means it is possible to use the lower priced unmodified or slightly modified starches as the adhesive base material and it is further possible to use a caustic alkali to increase the fluidity of the adhesive and thereby reduce the amount of water required and the drying time.

The additional equipment which is usually required to adapt our method of adhesive operation to present day machines for laminating or tube winding, for example, consists merely of a spraying device or a roll applicator device, or an equivalent means by which an aqueous solution of boric acid may be applied to the paper surface.

Construction of devices of this nature is well known to those familiar with the art of applying fluid materials to moving paper surfaces.

With reference to the adhesive material to be used, in our process an essential requirement is that the adhesive be of the amylaceous type and of a predominantly starchy nature. It should have a starch content above 50% and preferably above 75%, as determined by the method of Babington, Tingle and Watson, "The Examination of Commercial Dextrine and Related Starches," Journal of the Society of Chemical Industry, 37 (1918) 257. A starchy material of this type, as previously explained, will ordinarily set back to a gel when it is cooled after being cooked, but this is prevented in accordance with the present invention and the fluidity of the adhesive composition is increased by adding to the amylaceous adhesive as an auxiliary material a caustic alkali.

In carrying out the present invention there are several variations of the method which may be employed. For example, the boric acid may be applied to one of the surfaces to be laminated and the alkali-containing amylaceous adhesive composition may be applied to another of said surfaces. Then when the two surfaces are brought together the reaction between the boric acid and the alkali immediately reduces the alkalinity and at the same time reduces the fluidity. The relative proportions of boric acid and caustic soda are preferably such that the boric acid is sufficient to react with the free caustic soda and form sodium tetra borate. In some cases, however, where the paper is very highly sized, it may be desirable to leave some of the caustic alkali in a free state in order to partially break down or destroy the sizing. It is undesirable in any case, however, to leave a sufficient amount of the caustic alkali in free state that the sizing is entirely destroyed. The major proportion of the caustic alkali should always be reduced to sodium tetra borate in accordance with the preferred practice of this invention. Another method of procedure is to apply the boric acid to the laminating paper or other laminating material, thereafter apply the alkali-containing amylaceous adhesive composition to the boric acid treated paper, and then press the resultant paper together with another material which is untreated. This has the advantage that the caustic alkali is immediately transformed to sodium tetra borate or at least partially neutralized before it has any opportunity to act upon the size contained in the paper. A third method of procedure is to treat both of the surfaces which are to be joined with boric acid and then apply the alkali-containing amylaceous adhesive to one or both surfaces.

In any of these procedures the material to which the adhesive is applied may be wet or dry. For example, if the boric acid is applied to the paper in the paper mill either at the calender rolls or in some other portion of the paper making machine, the paper will ordinarily be dried before it is used in a laminating operation and the boric acid will be present in substantially dry form but nevertheless will serve to activate and react with the alkali-containing amylaceous adhesive which is subsequently applied to the paper in a laminating operation. If the boric acid is applied to the paper directly on the laminating machine the paper will still be wet when the amylaceous adhesive containing the alkali is applied. The addition of the boric acid during the paper making step has the advantage that less water has to be removed by drying in the laminating operation.

It is not absolutely essential that the boric acid be added in solution. It may be dusted on in powdered form to the surface of the paper on the laminating machine just before or just after the adhesive has been applied. The addition of the boric acid in solution form, however, tends to give a more uniform distribution and a more uniform bonding action.

For such types of combining operations wherein the boric acid or boric acid solution is applied to a surface which is subsequently to be brought into contact with another surface containing a coating of an alkaline amylaceous adhesive of the character previously described or to the surface which is subsequently to be coated with the adhesive, it is sometimes preferable to incorporate with the boric acid or the boric acid solution a proportion of some colloidal material capable of thickening or rendering the aqueous solution more viscous so that it will lie upon the surface to which it is applied and not be substantially absorbed into the surface before coming into contact with the adhesive. By thus keeping the boric acid on the surface of the sheet it is more readily available to react with the alkali in the adhesive.

Any compatible material capable of forming a viscous hydrosol may be used for this purpose such as, for example, gelatinized starch or starch degradation products, natural gums such as locust bean gum, tragacanth gum, Irish moss, gum arabic or viscous solutions of various protein materials, water soluble synthetic resins, etc.

For the purpose of illustrating our invention we submit the attached drawings and the following description showing the manner in which our adhesive application may be utilized. By the term "supplementary equipment" we refer to the equipment used to apply the boric acid to the paper surface or to the adhesive coating.

Figures 1, 2, 3, 4, 5 and 6 are schematic diagrams showing various general means of applying our method of adhesive application to combining operations.

Figure 1 represents an example where the adhesive 3 is applied to the surface 8 of a moving sheet of paper 7 by means of a roll 2 and adhesive pan mechanism 1. The adhesive coated surface 3' is subsequently sprayed with a thin coating of boric acid 5 by means of a spraying mechanism 4. The adhesively coated and treated sheet 7, 3', 5' is subsequently brought into contact with surface 10 of another sheet of paper 9 by means of pressure rolls 6, thus forming a bond between the two paper sheets to give a laminated paper product 11.

Figure 2 represents an example where the adhesive $3a$ is applied to the surface $8a$ of a moving sheet of paper $7a$ by means of a roll $2a$ and adhesive pan mechanism $1a$. Simultaneously a second sheet of paper $9a$ is thinly coated with the boric acid $5a$ by means of a roll and pan mechanism $4a$. Subsequently the adhesive coated surface $3a'$ of paper sheet $7a$ is brought into contact with the boric acid coated surface $5a'$ of paper sheet $9a$ by means of pressure rolls $6a$, thus forming a bond between the two paper sheets to give a laminated paper product $11a$.

Figure 3 represents an example where a surface $8b$ of a paper sheet $7b$ is coated with the boric acid $5b$ by means of a roll and pan mechanism $4b$. Subsequently the same surface $8b$ of paper sheet $7b$ is coated with an adhesive $3b$ by means of a roll $2b$ and adhesive pan mechanism $1b$. The surface $8b$ of paper sheet $7b$ with its applied coating of adhesive $3b'$ is then brought into contact with the surface $10b$ of a second sheet of paper $9b$ by means of pressure rolls $6b$, thus bonding the two sheets together and forming a laminated paper product $11b$.

Figure 4 represents an example wherein a surface $8c$ of a sheet of paper $7c$ is coated with an adhesive $3c$ by means of a roll $2c$ and adhesive pan mechanism $1c$. Subsequently the adhesive coated surface $3c'$ of said paper sheet is sprayed with a thin coating of boric acid $5c$ by means of a spraying machanism $4c$. Subsequently the adhesive coated and treated paper sheet is wound on a mandrel $8c$ to form a tube, the adhesive coated side of the sheet forming a bond with the opposite side $10c$.

Figure 5 represents an example wherein a surface $8d$ of a paper sheet $7d$ is thinly coated with the boric acid $5d$ by means of a roll and pan mechanism $4d$. Subsequently the coated surface $5d'$ of paper sheet $7d$ is coated with an adhesive $3d$ by means of a roll $2d$ and adhesive pan mechanism $1d$. The treated paper sheet with its applied coating of adhesive is then wound on a mandrel $6d$ to form a tube, the adhesive coated side of the sheet forming a bond with the opposite side of the sheet $10d$.

Figure 6 designates a schematic diagram illustrating the means by which our invention may be applied to a laminating operation involving more than two plys of paper. The equipment and mode of operation illustrated in this example are essentially the same as that used in present day laminating operations with the exception of the added supplementary equipment shown in section A of the drawings, which is used to apply the viscosity increasing agent. Reference characters 7e, 12, 13, 14 and 9e designate five paper liners which are to be bonded together to form a five ply paper board. Section A of the drawings designates the added supplementary equipment for the purpose of applying a coating of the boric acid 5e to both surfaces of paper liners 12 and 14. Section B represents a conventional roll and adhesive pan mechanism whereby a coating of adhesive is applied to both surfaces of the three paper liners 12, 13 and 14. Section C of the drawings represents a conventional type of pressure roll mechanism whereby the outside paper liners 7e and 9e are brought into contact with the exposed adhesive coated surfaces of liners 12 and 14. Numerals 15 and 16 designate piping by which the boric acid 5e is applied to the upper surfaces of paper liners 12 and 14, respectively, the excess overflowing into the reservoir pans diagrammatically illustrated. The amount of boric acid applied to the paper surfaces is regulated by the degree of pressure between the spreading rolls illustrated at 4e and 4e'. Reference characters 17 and 18 designate the piping by which the adhesive 3e is applied to the upper surface of liners 12 and 13, the excess of adhesive overflowing into the adhesive pan 1e and being recirculated. The amount of adhesive applied is regulated by the degree of pressure between the spreading rolls 2e and 2e'. The outer liners are finally bonded to the inner liners by pressure rolls 6e, forming laminated paper 11e. As shown, the inner surface 8e of liner 7e is bonded to liner 12 and surface 10e of liner 9e is bonded to liner 14.

It should be understood that these drawings and the above descriptive matter are for the purpose of making clear the manner and means in which our two stage method of adhesive application may be applied, and we do not wish the scope of our invention to be limited by these specific examples.

It will be evident on consideration of the principles involved in our new method of adhesive application that a definite relationship exists between the composition of the adhesive used and the boric acid.

We submit below several examples of adhesive formulae along with corresponding examples of suitable viscosity increasing agents to be used in conjunction with the adhesive as outlined above.

EXAMPLE I

*Adhesive*

|  | Parts |
|---|---|
| Tapioca British gum | 100 |
| Water | 300 |
| Caustic soda | 2 |

The above mixture is heated to a temperature of about 180° F. to disperse the British gum and form a fluid adhesive.

*Supplemental agent*

A 5% solution of boric acid.

EXAMPLE II

*Adhesive*

|  | Parts |
|---|---|
| Oxidized corn starch (Superfilm #4) | 50 |
| Water | 200 |
| Caustic soda | 3 |

The above mixture is agitated and heated to a temperature of 180° F. The resultant product was a viscous fluid adhesive.

*Supplemental agent*

100 parts of the above adhesive are mixed with 10 parts of boric acid and 30 parts of water and heated and agitated until a substantially viscous but free flowing fluid is obtained. This mixture of the adhesive with an excess of boric acid functions as the supplemental agent.

In this example the supplemental agent may be considered as a supplementary adhesive having acid characteristics which when used in a two stage method of application with the adhesive proper, having alkaline characteristics, gives a resultant adhesive coating of high viscosity but of lower alkalinity than the adhesive containing caustic soda.

It should be understood that the above examples of adhesive formulae are merely for the purpose of illustrating our invention and we do not wish the scope of our invention to be limited by these examples. In general, any predominantly starchy amylaceous adhesive material is suitable for our purpose regardless of the means by which it is prepared, providing the principles of the invention herein disclosed are observed. Thus, the adhesive may be derived from root starches, as, for example, potato, sweet potato, sago, or tapioca, or from grain starches, for instance, corn, rice, wheat and oats.

It furthermore should be understood that various inert fillers such as clay or whiting, plasticizers, wetting agents, or additional non-amylaceous adhesive materials may be utilized with the adhesive means we disclose for the purpose of obtaining those special effects for which the use of such material is well known to the prior art.

Having thus described the invention, what we claim as new and desire to secure by Letters Patent of the United States is:

1. In the art of joining two surfaces together, the steps which comprise, applying in a separate phase, to at least one of said surfaces, boric acid and a predominantly starchy amylaceous adhesive dispersed in water with an alkaline fluidity increasing agent, and bringing said surfaces together to effect a bond therebetween.

2. In the art of bonding two porous surfaces together, the steps which comprise, applying in a separate phase, to at least one of said surfaces, boric acid and a predominantly starchy amylaceous adhesive dispersed in water with a caustic alkali, and bringing said surfaces together to from a bond therebetween.

3. In the art of bonding two paper surfaces together, the steps which comprise, forming a coating containing boric acid on at least one of said paper surfaces, and treating said coating with a predominantly starchy amylaceous adhesive dispersed in water with an alkaline fluidity increasing agent.

4. A method of laminating paper which comprises placing a coating of an aqueous dispersion of a predominantly amylaceous adhesive containing caustic soda upon one paper surface, applying boric acid to the other surface and then joining the surfaces together to effect a bond with drying of the adhesive in situ, said boric acid being at least slightly in excess of that required to react with the alkali in the adhesive to form sodium tetraborate.

5. In the art of laminating paper, the steps which comprise applying boric acid to the paper, applying in a separate phase a coating of an aqueous dispersion of predominantly starchy amylaceous adhesive dispersed with caustic soda and then pressing the two surfaces together to form a bond therebetween, said boric acid being at least slightly in excess of that required to react with the alkali in the adhesive to form sodium tetraborate.

6. In the art of joining two surfaces together, the steps which comprise applying separately, to at least one of said surfaces, boric acid and a predominantly starchy amylaceous adhesive dispersed in water with an alkaline fluidity increasing agent containing an alkali of the type adapted to react with boric acid to produce a borate effective in increasing the viscosity of amylaceous dispersions, and bringing said surfaces together to effect a bond therebetween, said boric acid being at least sufficient to neutralize a major proportion of said alkali.

7. In the art of joining two surfaces together, the steps which comprise applying separately, to at least one of said surfaces, boric acid and a predominantly starchy amylaceous adhesive dispersed in water with an alkaline fluidity increasing agent containing an alkali of the type adapted to react with boric acid to produce a borate effective in increasing the viscosity of amylaceous dispersions, and bringing said surfaces together to effect a bond therebetween, said boric acid being in excess of that required to react with said alkali to form said borate effective to increase the viscosity of said adhesive.

8. In the art of bonding a paper surface to another surface, the steps which comprise forming a coating containing boric acid dispersed in an aqueous viscous hydrosol medium on at least one of said surfaces and treating said coating with a starchy polysaccharide adhesive dispersed in water with an alkaline fluidity increasing agent for said starchy polysaccharide containing an alkali of a type adapted to react with boric acid to produce a borate effective in increasing the viscosity of amylaceous dispersions, said boric acid being in excess of that required to react with said alkali to form a borate in an amount effective to increase the viscosity of the adhesive in situ.

9. In the art of bonding two surfaces together, the steps which comprise applying separately, to at least one of said surfaces, boric acid and a starchy polysaccharide dispersed in water containing about 1% to about 3% by weight of a caustic alkali and not more than 6 parts of water per part of starchy polysaccharide, and bringing said surfaces together to form a bond therebetween, said boric acid being at least slightly in excess of that required to react with the alkali in the adhesive to form an alkali tetraborate.

HANS F. BAUER.
JORDAN V. BAUER.
DON M. HAWLEY.